Figure 1:
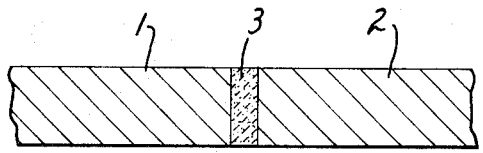

United States Patent [19]
Bergstrom et al.

[11] 3,716,347
[45] Feb. 13, 1973

[54] METAL PARTS JOINED WITH SINTERED POWDERED METAL

[75] Inventors: Theodore R. Bergstrom, Little Canada; Philip D. Takkunen, Woodbury Township, Washington County, both of Minn.

[73] Assignee: Minnesota Mining and Manufacturing Company, St. Paul, Minn.

[22] Filed: Sept. 21, 1970

[21] Appl. No.: 73,891

[52] U.S. Cl. ............ 29/182.2, 29/191.2, 29/192, 29/471.1, 75/208 R
[51] Int. Cl. .................................. B22f 1/00
[58] Field of Search ......... 75/208 R; 29/182.2, 471.1, 29/192, 191.2

[56] References Cited

UNITED STATES PATENTS 3,534,464  10/1970  Lallemant ................... 29/471.1 X
3,479,231  11/1969  Mantel et al. ............... 29/471.1 X
3,419,388  12/1968  Arutunian ..................... 75/208 R
3,436,307  4/1969   Johnson et al. ............. 29/182.2 X
3,401,025  9/1968   Whitney ....................... 29/191.2 X
3,071,526  1/1963   Litt ............................... 75/208 R X
2,855,296  10/1958  Koehring ........................ 75/208 R
2,372,607  3/1945   Schwarzkopp ............... 75/208 R Primary Examiner—Leland A. Sebastian
Assistant Examiner—R. E. Schafer
Attorney—Kinney, Alexander, Sell, Steldt & Delahunt

[57] ABSTRACT

Metal parts are joined together with sintered powdered metal by applying a mixture of powdered metal and an organic heat-fugitive binder to the parts at the locus of the joint of to be formed therebetween, assembling the parts in their desired joined configuration, and heating the assembly to volatilize or burn-off the binder and sinter the powdered metal.

17 Claims, 5 Drawing Figures

PATENTED FEB 13 1973

3,716,347

INVENTORS
THEODORE R. BERGSTROM
PHILIP D. TAKKUNEN
BY Kinney, Alexander,
Sell, Steldt & DeLaHunt
ATTORNEYS

METAL PARTS JOINED WITH SINTERED POWDERED METAL

This invention relates to powder metallurgy. In another aspect it relates to the metalworking field in which metal parts are joined or bonded together to form a metallurgically integral metal article.

In the metalworking art it is common to fabricate articles, such as structural members, by joining metal parts by means of metal fasteners, such as bolts and rivets, adhesives, welding, and brazing. Each of these means of joining metal parts are useful but all of them have limitations. Mechanical fasteners require the tedious placement of a host of fasteners which significantly add to the weight and size of the fabricated article. Structural adhesives are limited by temperature and weathering conditions encountered in the use of the fabricated article. Welding and brazing have their drawbacks (see U.S. Pat. No. 3,496,630), requiring the use of molten metal to form a fusion bond. Also, brazing materials may give rise to galvanic corrosion due to the fact that they have a composition different than the metal parts to be joined. Welding results in heat-affected zones and may cause severe distortion of the parts to be joined. Though it is known (see U.S. Pat. No. 3,170,324) to bond metal parts together solely by solid state diffusion, this technique requires close tolerances and high pressures and/or temperatures. Solid state diffusion with the interposition between the metal parts of a very thin dispersion of refractory powdered metal in a volatile paste has been limited to refractory metals. The major mechanism of the bond formed by this latter technique has been postulated as a grain-boundary migration across the contact plane of the metal parts being joined.

Figure 2:
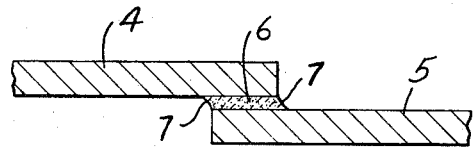
Figure 3:
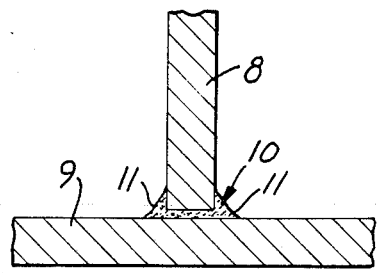
Figure 4:
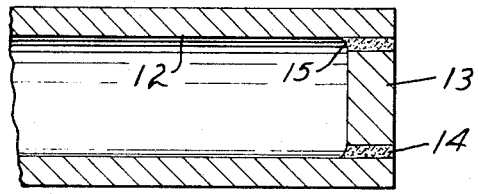
Figure 5:
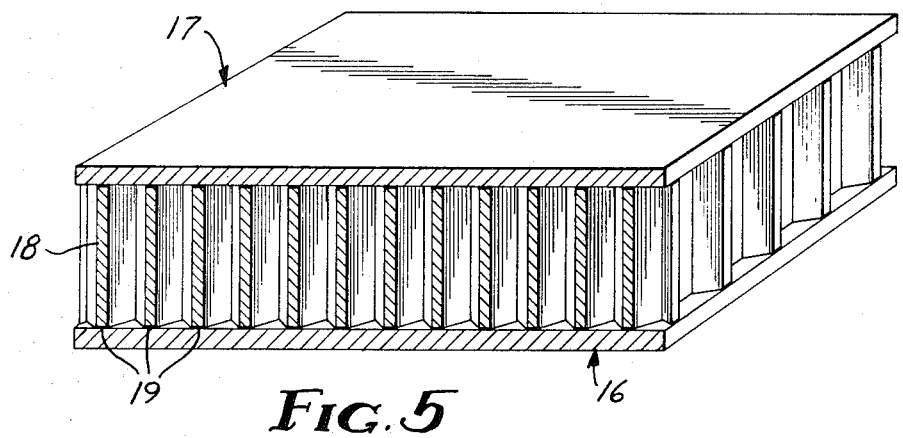

In the accompanying drawing,
FIGS. 1, 2, and 3 illustrate in cross-section various types of joints formed between metal parts in accordance with this invention, namely, a butt joint, a lap joint, and a T-joint, respectively;
FIG. 4 illustrates in cross-section a cylindrical joint made according to this invention between a metal cylinder and a metal disc closing the end thereof; and
FIG. 5 is a perspective and partial cross-section view of a honeycomb structure illustrating the application of this invention.

Briefly, according to this invention a green mixture of powdered metal (preferably a powdered non-refractory metal, such as powdered stainless steel) and an organic heat-fugitive binder is interposed between metal parts to be joined, the parts are assembled in the desired joint configuration, and the interposed mixture heated to volatilize, burn-off, or otherwise remove the binder and to sinter the powdered metal, thereby forming a sintered metallurgically integral joint between the metal parts, the bonded assembly being in effect a single piece of metal.

The term "metallurgically integral" in this context means that there is a solid state or interatomic diffusion, i.e., there is a solid state or a liquid phase sinter bond, or a combination of both types of sinter bonds between contiguous powdered metal particles and between the surfaces of the metal parts and powdered metal particles contiguous therewith. At the juncture between the sintered powdered metal and the metal part contiguous therewith, there will be a solid state diffusion zone of the powdered metal and said metal part with the balance of the sintered powdered metal between the adjoined metal parts having a density less than that of the theoretical density of the powdered metal (e.g. 40–98 percent of theoretical density), a uniform microporosity, and a grain structure free of dendritic grains. When the assembly of the metal parts and green joint are heated as a whole at sintering temperatures to sinter the powdered metal, the portion of the metal parts adjacent the solid state diffusion zones of the joint are free of heat-affected zones, unlike that which occurs when metal parts are joined by welding. Localized sintering, i.e., at the joint, can also be used.

Assemblies of metal parts joined by the practice of this invention have desirable mechanical properties such as high tensile and fatigue strengths and thermostability at high temperatures. The amount of powdered metal necessary to effect such joints is relatively small and the weight and space occupied by the sintered powdered metal are relatively minor. Further, close dimensional tolerances between the metal parts to be joined (normally necessary in successful brazing, welding, or diffusion bonding) are not necessary to achieve a strong joint by the practice of this invention, though such tolerances may be obtained and retained if desired. The application of powder metallurgy in the joining of metal parts also has the advantage in that the joining material (i.e., the sintered powdered metal) can be of the same composition as the metal parts to be joined, thus avoiding or minimizing galvanic corrosion and thermal fatigue. Other advantages will be apparent to those skilled in the art.

The types of metals which can be joined by the practice of this invention can vary, such metals including any of those commonly used for structural purposes, particularly the transition metals of the 4th, 5th, and 6th periods of the Periodic Table (as described on p. 448–449 of Handbook of Chemistry & Physics, 34th Ed., Chem. Rubber Pub. Co.), e.g. iron, nickel, cobalt, copper, titanium, beryllium, and chromium, and alloys thereof such as stainless steel and other steels, inconel, nichrome, and monel. Of course, the parts to be joined cannot have melting points lower than the sintering temperatures necessary to effect the bond made in accordance with this invention.

The metal parts to be joined can be made of wrought metal, cast metal, sintered powdered metal, or porous metal, and joints can be made of common metal parts, e.g., wrought metal-to-wrought metal, or different metal parts, e.g., wrought metal-to-sintered powdered metal. An advantage of joining porous metal parts in accordance with this invention over brazing is that the powdered metal of the bond produced by this invention does not "wick" or penetrate the porous metal parts, to a significant degree.

Before joining the metal parts in accordance with this invention, it first generally will be desirable to prepare their surface to ensure a good bond. For example the surface of the parts can be mechanically cleaned with a wire brush or abrasive blasting and then chemically cleaned. The surfaces of the members to be joined may be modified by the use of surfactants, etching agents, or mechanical abrasion so as to change the surface energy of the parts and hence the degree of their wettability by the green material. The joining of stainless steel metal parts by the practice of this invention is a preferred embodiment thereof (particularly when stainless steel powdered metal is used to form the joint). The stainless steels are preferably chromium-nickel stainless steels, these alloys generally containing 16.0 to 26.0 weight percent chromium, 6.0 to 22.0 weight percent nickel, 0.03 to 0.25 weight percent carbon, and occasionally some other elements added to develop certain specific properties, such as 1.75 to 4.00 weight percent molybdenum or small amount of titanium, tantalum, and niobium to minimize formation of chromium carbides, especially in welding. Standard types of these steels have been assigned numbers and specifications by the American Iron and Steel Institute. All of these AISI stainless steels are applicable in the practice of this invention, e.g. the austenitic series such as types 301, 302, 304, 305, 316 and 347.

The powdered metals used in the practice of this invention, in addition to the stainless steels mentioned above, representatively include known sinterable metals used in conventional powder metallurgy such as iron, copper, nickel, beryllium, chromium, cobalt, molybdenum, tantalum, titanium, tungsten, and alloys thereof. The stainless steel metal powders disclosed in copending application Ser. No. 743,588, now U.S. Pat. No. 3,620,690 will be particularly useful because of the enhanced bond strength and corrosion resistance which can be obtained. Precipitation hardening stainless steel, e.g. PH-15-7 Mo, and nickel based alloys, e.g. Inconel-625 can also be used. The non-refractory metals and alloys being preferred as powdered metals because of the lower sintering temperatures which can be used in sintering them in the fabrication of joints. The powdered metal to be used will depend upon the particular metal used in the parts to be joined, the desired sintering temperature, and whether a porous or non-porous joint is desired. Though the two metals may differ, it will be desirable if they are both the same where differential thermal expansion or galvanic corrosion is to be avoided.

The size of the powdered metal particles used in the practice of this invention can vary and generally the particular powdered metal used will have a range of particle size. In some cases it will be desirable to use blends of two or more powdered metal products or mesh sizes. For example, powdered metal with sizes in the range of 150 microns to less than 1 micron can be used, such as less than 44 microns or a product with about an average of 10 microns, or blends can be used. For some applications, it may be desirable for the joint between the metal parts be impervious to fluids, while in other applications it may be desirable for the joint to be porous. The desired porosity or imperviousness of the joint can be achieved by proper selection of size or sizes of the powdered material to be used and the amounts thereof. Generally, the larger the particle size, the more porous the resulting sintered powdered metal bond.

In preparing the joining material used in this invention, (sometimes referred to herein as the green bonding material), the powdered metal of desired particle size is blended with an organic heat-fugitive binder. Thermosetting materials, which cure to infusible solids upon heating, are particularly useful as the binder, since, when incorporated into the green bonding material of this invention, they will keep the applied material rigid when heated at temperatures sufficient to cure the same, and as such aid in keeping the assembled metal parts in their desired joint configuration prior to sintering. Thermosetting materials which can be used include those disclosed in U.S. Pat. Nos. 2,851,354, 3,158,532 and in copending application Ser. No. 813,758, now abandoned. The amount of thermosetting material to be used, functionally stated, will be that sufficient to impart the above-discussed rigidity prior to sintering. Generally, this amount will be 1 to 20 weight percent of the green bonding material. Catalysts which catalyze the curing of such thermosetting materials can also be included in the green bonding material, including those catalysts conventionally used for thermosetting materials and those disclosed in said copending application, such silver trifluoromethylsulfonate. Thermoplastic materials can also be used such as those disclosed in U.S. Pat. Nos. 2,593,943 and 2,709,651. Representative thermoplastics which can be used as binders include polyolefins, polystyrenes, polyamides, acrylics, polyacetate, polycarbonates, and polyethers. Various vehicles can be used in conjunction with these binders, such as water, as well as various plasticizers, such as glycerin, polypropylene glycol, and the like. These vehicles can be miscible or immiscible with the binder and generally will be used in amounts sufficient to provide the desired viscosity to the green bonding material and control its placement or shape. The vehicle should be volatilizable below the curing temperature of the thermosetting resin, where used. Thixotropic and wetting agents can be incorporated into the green bonding material to control its flow characteristic.

The blending of the components of the green bonding material can be carried out in a conventional manipulative manner in various types of commercially available mixers, blenders, tumblers, and the like, care being taken to ensure that the blend is homogeneous and the components well-dispersed. The resulting blend will be in the nature of a slurry or plastic mass or dough, depending on its temperature, and depending on the particular materials and amounts thereof used and the extent and configuration of the joint to be made.

The green material can be applied to the locus of the metal parts to be joined by various means depending upon its consistency and the nature of the joint to be made. Where the mixture comprising powdered metal and binder is in the nature of a plastic mass, it can be shaped on a rubber mill, calendered, or knife-coated to the desired thickness and then dried to form a green sheet or film having a leathery nature. The green sheet can then be cut to the desired shape and size. In the case of a slurry, the metal parts can be dipped into the slurry or painted with it. Other methods of application will become apparent.

The green material of this invention can be interposed between the metal parts to be joined and the combination assembled and held in the proper contiguous relation using suitable fixtures or the like where necessary. The parts are preferably pressed together sufficiently to ensure that the green material spreads over the desired locus of the joint to be formed. The thickness of the interposed green material can vary and can be as much as 0.010 inch or greater. Where the parts to be joined lie in different planes, as in the case of a lap joint or T-joint, the green material will form an exposed concave fillet at the exposed extremities of the joint, such a fillet adding to the strength of the joint. The assembly of the parts is then heated to volatilize the vehicle and cure the binder. The integral green structure is then sintered under vacuum or a suitable atmosphere, such as a reducing atmosphere like hydrogen or dissociated ammonia. Sintering atmosphere, temperature, and duration of sintering will depend upon the particular powdered metals used, the selection of these conditions being within the skill of the art. In the case of the austenitic stainless steels mentioned above, a hydrogen or dissociated ammonia atmosphere with a dew point of −40°F. or lower and sintering temperatures in the range of 1,000° to 1,375°C., preferably 1,200° to 1,300°C., will be suitable, and the duration of sintering will usually be from 10 minutes to 2 or 3 hours.

As is evident from the above, the material joining the metal parts in accordance with this invention is made entirely from powdered metals without requiring or employing wrought metal components. The joint is constructed without welding or brazing and is, therefore, free of the disadvantages associated with such prior art means of joining metal parts. An important advantage or feature of the joint of this invention is the integral metallurgical or sinter bond between the adjoined metal parts.

This invention can be used to bond metal parts in various joint configurations or designs, such as butt joints, lap joints, angle joints, cylindrical joints, corner joints, stiffener joints and the like. In the accompanying drawing FIGS. 1–4 illustrate various joint designs which can be made. FIG. 1 illustrates a butt joint wherein metal parts 1,2 are joined by sintered powdered metal 3. FIG. 2 illustrates a lap joint wherein metal parts 4,5 are joined by sintered powdered metal 6, the exposed extremities of the sintered powdered metal being in the form of a fillet 7. FIG. 3 illustrates a T-joint in which the metal parts 8,9 are joined by sintered powdered metal 10, the exposed extremities of which are also in the form of a fillet 11. FIG. 4 illustrates a cylindrical joint, the assembly illustrated in this embodiment comprising metal cylindrical part 12 the end of which is closed by a metal disc 13 bonded to the inner wall of the cylinder by sintered powdered metal 14, the exposed extremity of which again is in the form of a fillet 15. Generally, fillets such as illustrated in FIGS. 2–4 will be formed when the metal parts to be joined are in different planes. Such a fillet increases the strength of the bond between the metal parts and prevents stress risers. In order to form such a fillet, the heat-fugitive binder mixed with the powdered metal will preferably comprise a thermosetting material as described, such as an epoxide, and the green mixture will be of sufficient consistency or viscosity such that after placement the shape of the fillet can be controlled. When heated, the thermosetting material will cure in the form of a solid and will be vaporized or burned-off as a solid, or otherwise removed from the joint.

FIG. 5 illustrates a honeycomb sandwich or panel which can be fabricated in accordance with this invention, such panels being useful as structural members in aircraft or the like. This panel can comprise, as wrought metal parts, a base sheet 16, a face sheet 17, and a honeycomb structure 18 disposed therebetween. The tops and/or bottoms of the webs making up the honeycomb structure 18 are bonded to said sheets 16,17 by sintered powdered metal 19, this type of joint being shown in detail in FIG. 3. The fillet shown there, in a honeycomb structure, is an example of formation of a fillet by the practice of this invention which is otherwise unobtainable as a practical manner by conventional welding. Unlike fabrication of honeycomb structures bonded in accordance with this invention, thin honeycomb webs tend to deform and melt during welding. The honeycomb sandwich of FIG. 5 can be prepared by dipping the tops and bottoms of the honeycomb structure 18 to a sufficient depth in a slurry of powdered metal and heat-fugitive binder so as to apply thereto a sufficient amount of the slurry necessary to effect a bond when such a honeycomb structure is sandwiched between sheets 16,17 and the assembly heated as described above.

A slurry (or slip) particularly useful for forming a joint between wrought metal parts of a honeycomb structure such as illustrated in FIG. 5 can be made up of 80 weight percent powdered stainless steel AISI Type 304 having an average particle size of 10 microns, 14.8 weight percent of polypropylene glycol vehicle (with a molecular weight of about 400), 5 weight percent of Epon–1001 epoxide, 0.025 weight percent of silver trifluoromethylsulfonate, and 0.2 weight percent of Calidria asbestos as a thixotropic agent. This slurry can be made by adding the powdered metal to a mixture of the other components, which mixture can have a consistency of 1,100 to 1,400 cps. Honeycomb, made of Type 347 stainless steel having ⅜ inch sq. cells, 0.002 inch web thickness, and ½ inch in height, is dipped into said slurry so as to deposit on the bottoms of the webs a sufficient amount of the slurry. The dipped honeycomb is then layed on an impervious backing sheet of Type 347 stainless steel having a thickness of 0.018 inch and lightly pressed to ensure good contact and fillet formation. The assembly is heated for 2 hours at 150°F. to lower the viscosity of the bonding material and enhance settling of the powdered metal. The temperature is then raised to 350°F. and held there for 2 hours to volatilize the polypropylene glycol. The assembly is then heated at 400°F. for 1 hour causing the curing of the epoxide to form a thermoset resin. At this point, rigid fillets are present between the metal parts of the assembly, these fillets comprising about 95 weight percent of powdered stainless steel. The top or opposite side of the honeycomb is assembled in a similar manner with a perforated sheet of stainless steel (Type 347) having a thickness of 0.018 inch and 0.050 inch holes on 0.093 inch centers. The assembly is then heated to about 1,200°C. in hydrogen to remove the epoxide and to cause the powdered metal to sinter and provide the sinter joints of this invention as described above. As modification, the top or face sheet of the honeycomb structure can be used in non-perforated form. In this latter modification, where the backing sheet and facing sheet are both non-perforated, it will be necessary to provide for escape of volatile and gaseous products during the heating of the assembly. This can be accomplished by using honeycomb which has holes in its web.

As another modification, the perforated face sheet can have a porous powdered metal sheet sintered to the top surface thereof as disclosed in copending application Ser. No. 27,079 filed on even date herewith, now U.S. Pat. No. 3,693,750 such a honeycomb structure being useful as an acoustic panel.

Various modifications and alterations of this invention will become apparent to those skilled in the art from the foregoing description without departing from the scope and spirit of this invention.

What is claimed is:

1. An article comprising wrought, cast, previously sintered, or porous metal parts joined together by a metallurgically integral joint of sintered powdered metal interposed between contiguous surfaces of said metal parts.

2. The article of claim 1 wherein said metal parts and powdered metal are stainless steel.

3. The article of claim 1 wherein said article is a honeycomb sandwich structure made of wrought metal parts.

4. The article of claim 1 wherein said joint is in the form of a fillet.

5. The article of claim 1 wherein said joint is a T-joint.

6. The article of claim 1 wherein said joint is a lap joint.

7. A method for forming an article according to claim 1, which comprises interposing between said metal parts a mixture comprising powdered metal and a heat-fugitive binder, assembling said parts in a desired joint configuration, and heating the assembly to remove said binder and sinter said powdered metal to form said metallurgically integral joint.

8. The method according to claim 7, wherein said binder comprises a thermosetting material.

9. An article comprising wrought, cast, previously sintered, or porous metal parts joined together by a green bonding material comprising a mixture of powdered metal and a solid heat-fugitive, cured, thermosetting material as a binder.

10. A honeycomb sandwiched structure made of wrought metal parts comprising a metal honeycomb structure disposed between two metal sheets, and sintered powdered metal in the form of metallurgically integral fillet joints joining the contiguous portions of said honeycomb structure and said sheets.

11. The structure according to claim 10 wherein said two metal sheets are non-perforated and wherein said honeycomb structure has holes in its web.

12. The structure according to claim 10 wherein one of said sheets is an impervious backing sheet and the other sheet is a perforated face sheet.

13. The structure according to claim 12 wherein a porous metal sheet is sintered to the top surface of said perforated face sheet.

14. The structure according to claim 13 wherein said porous metal sheet is a sintered powdered metal sheet.

15. A method for forming a honeycomb sandwiched structure made of wrought metal parts comprising a previously metal honeycomb structure interposed between two metal sheets, which comprises interposing between said honeycomb structure and said sheets a mixture comprising powdered metal and a heat-fugitive thermosetting binder, and heating the assembly to remove said binder and sinter said powdered metal to form metallurgically integral joints between contiguous portions of said honeycomb structure and said sheets.

16. The method according to claim 15 wherein one of said sheets is an impervious backing sheet and the other sheet is a perforated facing sheet having a porous sintered powdered metal sheet sintered to the top surface thereof.

17. The article of claim 1, wherein said metal parts are wrought metal parts.

* * * * *

UNITED STATES PATENT OFFICE
CERTIFICATE OF CORRECTION

Patent No. 3,716,347           Dated February 13, 1973

Inventor(s) Theodore R. Bergstrom & Philip D. Takkunen

It is certified that error appears in the above-identified patent and that said Letters Patent are hereby corrected as shown below:

Column 7, line 4, "27,079" should read -- 73,890 --;

Signed and sealed this 17th day of December 1974.

(SEAL)
Attest:

McCOY M. GIBSON JR.
Attesting Officer

C. MARSHALL DANN
Commissioner of Patents